UNITED STATES PATENT OFFICE.

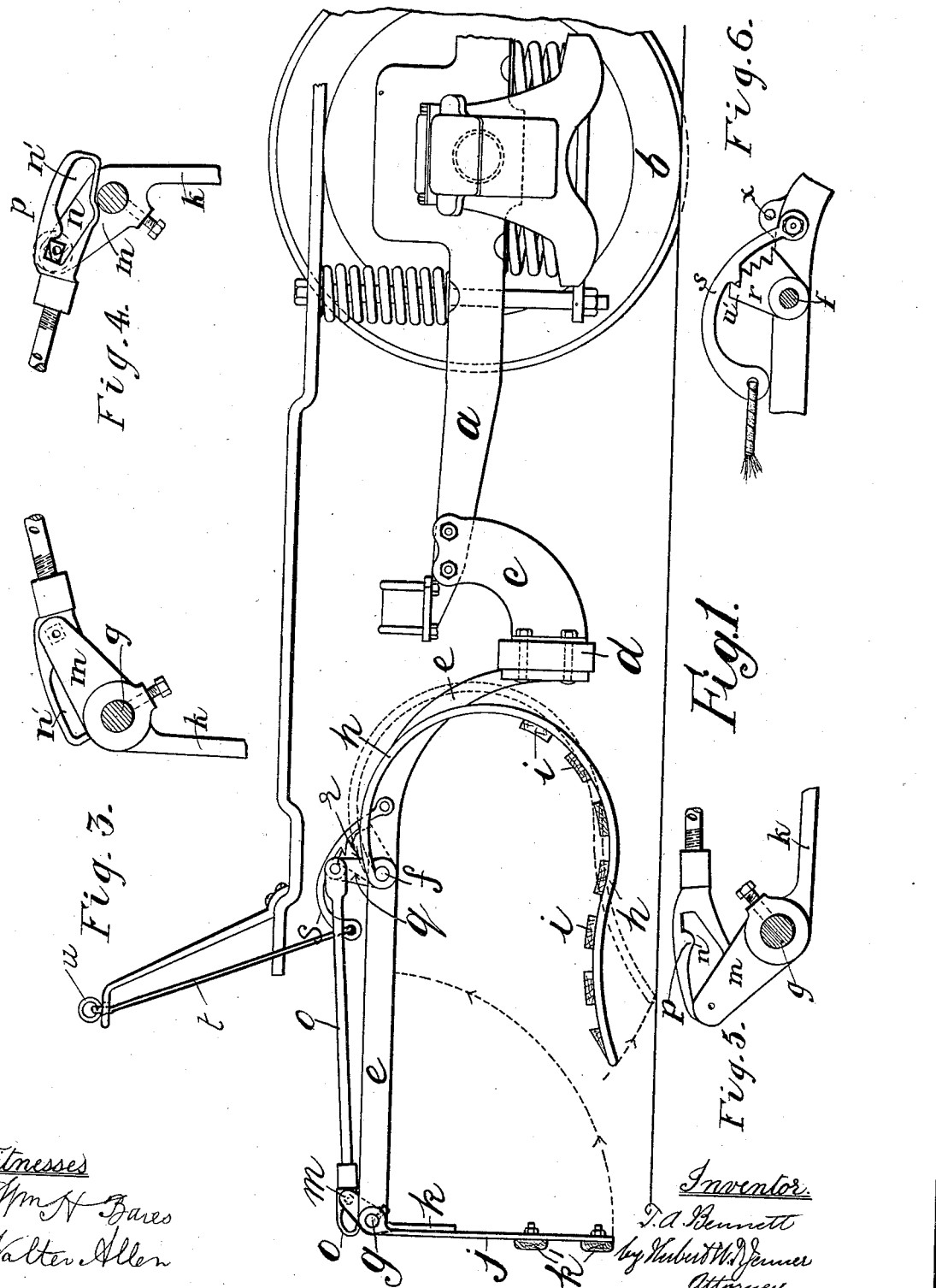

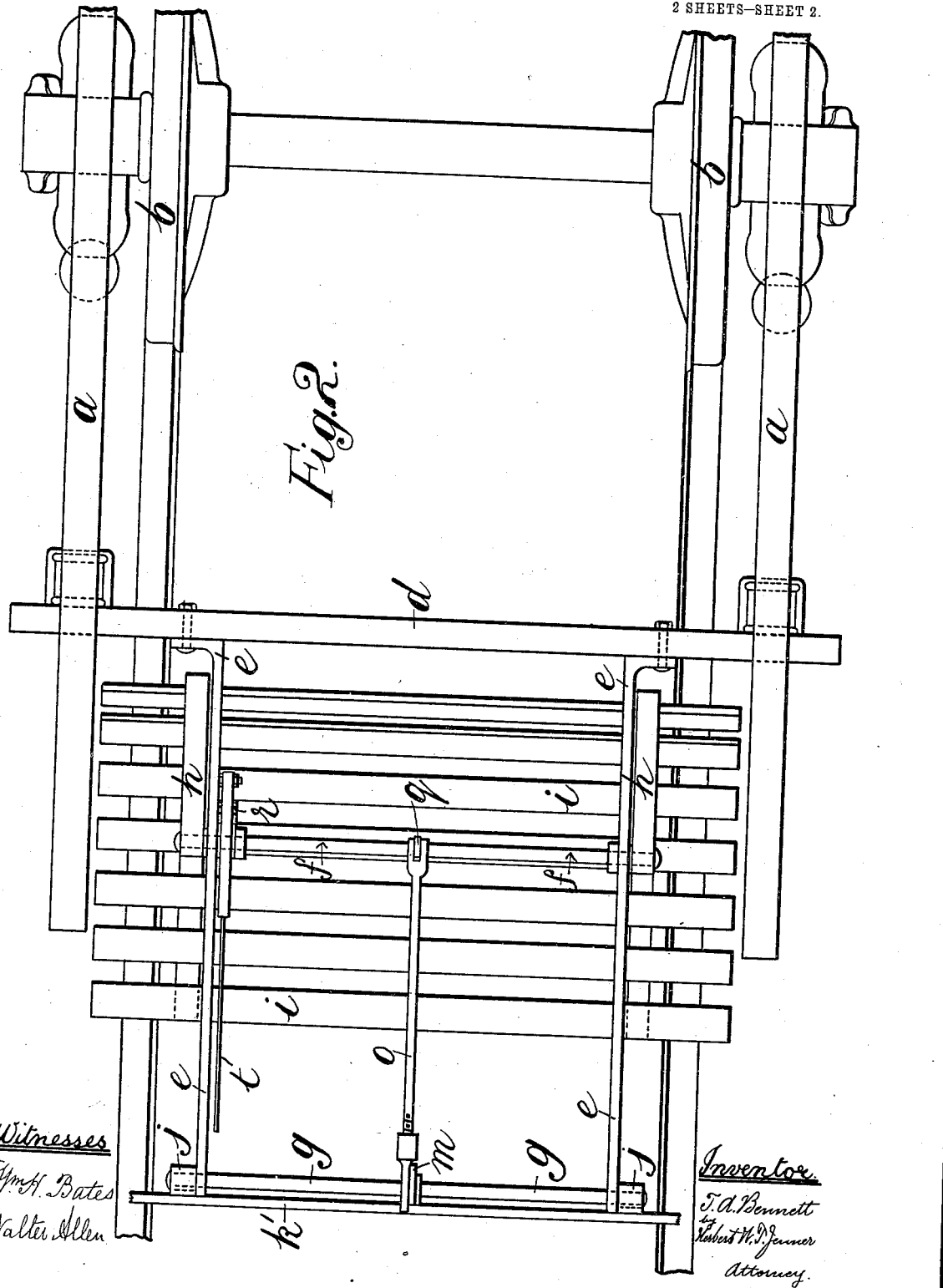

THOMAS ARTHUR BENNETT, OF NEWTON, HYDE, ENGLAND.

VEHICLE-FENDER.

1,041,726.  Specification of Letters Patent.  Patented Oct. 22, 1912.

Application filed October 16, 1911. Serial No. 654,934.

*To all whom it may concern:*

Be it known that I, THOMAS ARTHUR BENNETT, subject of the King of Great Britain and Ireland, and resident of Newton, Hyde, in the county of Chester, England, have invented certain new and useful Improvements in Vehicle-Fenders, of which the following is a specification.

My invention relates to improvements in accident-preventing devices or life-saving apparatus for use on electric tram cars and like vehicles and has particular reference to that type of device in which a cradle or tray, grid or the like is employed for receiving and supporting any body or obstruction that may be met with by the car, such tray being operated by means of a pivoted or swinging gate located a little distance in front of the tray and connected therewith by some intervening mechanism. That is to say, when the swinging gate strikes a body or obstruction on the track the gate is turned backward and by means of the intervening mechanism enables the tray to fall down on to the track in a position ready to pick up the obstruction which has operated the apparatus. Hitherto it has been a common practice to pivot the tray from some point of the underframe of the car body itself, the pivoted gate being likewise suspended from pivotal connections also carried by the underframe, so that in both instances these elements of the life-saving device partake of all the oscillatory movement due to the car body being supported by springs located between itself and the truck or underframe supported from the wheels of the vehicle, such truck or underframe being substantially stationary in a vertical direction so that it always remains, or nearly always remains, the same definite distance from the surface of the car track.

My invention comprises a life-saving device, the whole of the elements of which are entirely supported from the pilot board or non-vertically-moving truck; a tray or cradle of improved construction which will of its own weight normally remain in a position with its forward end above the track; a pivoted gate combined therewith and with intervening mechanism of an improved and novel type between such tray and gate together with automatic means for locking the tray or cradle firmly down on to the track after the pivoted gate has been operated by an obstruction.

My invention will be fully described with reference to the accompanying drawings which show sufficient of a car truck to which it is applied to enable the invention to be properly understood and in which, Figure 1 is a side elevation of the improved life-saving device, Fig. 2 plan of same, Figs. 3 and 4 elevations from opposite sides of part of the mechanism between the pivoted gate and tray or cradle, Fig. 5 side elevation of the parts shown in Figs. 3 and 4 in the position occupied after operation and Fig. 6 side elevation of the means for holding the tray or cradle in position after being operated, Figs. 3 to 6 being drawn to an enlarged scale.

In the aforesaid drawings $a$ indicates part of the truck supported by the car wheels $b$, $c$ a bracket secured to the forward end of the truck and $d$ a pilot board extending transversely of the vehicle body. To the pilot board $d$ I firmly secure by bolts or otherwise two brackets $e$ adapted to extend forwardly of the board toward the front of the car, such brackets supporting two shafts $f$ and $g$. The shaft $f$ has fixed to it two arms $h$, or more if required, of substantially C-shape in side elevation, such arms being in turn designed to support a number of laths, bars or the like $i$ or a wire netting or other suitable base to form a substantial cradle capable of supporting the body of a person when thrown on to it. The forward ends of the arms are bent slightly downward as indicated in the drawings and the whole shape of the tray or cradle is such that its main portion extends rearwardly of the shaft $f$ so as to overhang and normally tend to keep the front edge of the tray raised a few inches above the surface of the car track and so remain substantially self-supporting in that position. The shaft $g$ is located at the forward ends of the brackets $e$ and has suspended freely from it two or more arms $j$ to which are connected two or more bars $k'$ extending transversely of the car, though such bars may be substituted by a stout wire net or other medium so as to provide a gate for striking any obstruction on the track. On the same shaft $g$ I secure a lever or arm $k$ extending downwardly at the rear side of the pivoted gate, the latter normally resting against it and being kept in a substantially vertical position so as to prevent any swinging inward, though the gate may be capable of swinging forward. Formed in one with the arm *k* or separately secured firmly to the shaft *g* is another arm *m* provided at one side with a snug or projection *n* adapted to pass into a cam-shaped slot *n'* provided at the forward end of a link *o*, such cam-shaped slot being formed to provide a projecting portion *p* against which the snug normally rests when the parts are in the position indicated in Fig. 1 and in Figs. 3 and 4. The rearward end of the link *o* is coupled to the end of a lever *q* which is firmly fixed on the shaft *f* and can partake of the movement of said shaft.

On the shaft *f* there is also fixed a toothed sector or ratchet *r* in conjunction with which operates a weighted or spring-controlled pawl *s* pivoted to one of the brackets *e*, the pawl normally resting on the ratchet with its forward end overhanging the latter. Such forward end may have secured to it a cord, cable or chain *t* which may be passed in any suitable manner through the platform of the car and terminate in a handle *u* at a convenient point for operation by the driver of the car when required, as hereinafter referred to. The ratchet *r* is provided at one end with a tooth *u'* longer than the remaining teeth of the ratchet, that is to say, it extends above the surface of such teeth and is intended to act with the toothed pawl to prevent the overhanging tray rising above a certain distance from the car track while on the other hand the pawl itself is prevented being raised beyond the long tooth *u'* by a projection or stop *x* located behind it so that in this way the tooth *u'* cannot get beyond the tooth on the pawl and consequently the tray is normally held in a definite position.

The parts of the apparatus shown in Figs. 1 and 2 are in the position they normally occupy during the ordinary running of the car in a forward direction, but when an obstruction appears on the track, the pivoted gate comes in contact with it and is forced in a rearward direction, so operating the arm *k* and turning the shaft *g* in its bearings so that the projection or snug on the arm *m* engaging with the projection *p* pulls the link *o* forwardly and the latter in turn draws forward the lever *q* so turning the shaft *f* and lowering the forward edge of the tray on to the car track. Simultaneously the toothed sector is moved and the pawl drops into or behind one of its teeth and so locks the forward end of the tray against the car track in the position to which it has been moved by the intervening mechanism. The obstruction is thereby caught up by the tray and retained safely on the latter, the pivoted gate being afterward free to drop into the normal position, though the arms *k* and *m* remain in the position indicated in Fig. 5, the snug on the arm *m* having passed to the forward end of the cam-shaped slot on the link *o*. The arms, may, however, be readily turned into their normal position after the obstruction has been removed from the tray while the pawl may be lifted up by the driver through the agency of the cord, cable or the like so as to allow the tray to also resume its normal position. This action may also place the arms *k* and *m* in the normal position.

I would have it understood that the tray may be operated without first operating the pivoted or swinging gate, by any obstruction which may get in behind the gate and in front of the tray or cradle, that is to say, in a direction transversely of the car. Under such circumstances the obstruction would be caught by the front edge of the tray as the vehicle moved forward, causing such front edge to be depressed toward the car track when the pawl and ratchet mechanism would act in the same way as previously described to lock the tray against the track. The operation of the tray in the manner described would, of course, operate the link *o* and the arms *k* and *m*, these arms being merely turned into the position indicated in Fig. 5, the pivoted gate remaining suspended in the vertical position. I would, however, have it understood that it is quite possible to connect the pivoted gate rigidly to the arm *k* in which case the parts would move rearwardly in unison when the gate was operated by an obstruction or whether the obstruction operated directly on the front edge of the pivoted tray. I prefer, however, the construction in which the pivoted gate is separate and distinct from the arm *k*.

A device of the character described is extremely useful and effective inasmuch as the whole of the elements composing it are carried by the truck frame itself and have no connection with the car body suspended in a resilient manner from such truck and so not being subjected to considerable oscillation during the running of the car or by the load of passengers boarding one end of the car as very often occurs.

What I claim as my invention and desire to protect by Letters Patent is:—

1. A life-saving device for tramway and like vehicles consisting of brackets secured to the underframe of the car truck, such brackets extending forwardly of the frame, a shaft near the rearward end of said brackets and carried by them, a cradle or tray having the major portion of its construction extending rearwardly of the shaft, a lever mounted on the aforesaid shaft, a link coupled to said lever and extending forwardly and provided at its forward end with a cam-shaped slot, a projection within the slot, a second shaft supported in the forward ends of the brackets previously referred to, a pivoted gate downwardly suspended from said shaft, a lever fixed on the shaft having a downwardly extending arm located behind the pivoted gate and a second arm provided with a snug in normal engagement with the projection in the cam-shaped slot of the link previously referred to, substantially as described.

2. In a life-saving device for tramway and like vehicles the combination of brackets secured to the underframe of the car truck and extending forwardly of such, a shaft near the rearward end of said brackets and carried by them, a cradle or tray having the major portion of its construction extending rearwardly of the shaft, a lever mounted on the aforesaid shaft, a link coupled to said lever extending forwardly and provided at its forward end with a cam-shaped slot, a projection within the slot, a second shaft supported in the forward ends of the brackets previously referred to, a pivoted gate downwardly suspended from said shaft, a lever fixed on the shaft having a downwardly-extending arm located behind the pivoted gate and a second arm provided with a snug in normal engagement with the projection in the cam-shaped slot of the link previously referred to, a toothed sector fixed on the cradle shaft and a pivoted pawl mounted on one of the brackets supporting the tray substantially as described.

3. A life-saving device for tramway and like vehicles comprising two brackets fixed to the truck frame, a shaft carried by said brackets, a cradle or tray having the major portion of its construction extending rearwardly of the shaft, a toothed sector fixed on the cradle shaft having a number of ordinary teeth and a longer tooth, a pivoted pawl in engagement with the toothed sector and overhanging it, a projection located behind the pawl arm, a cord, chain or cable connected to the forward end of the pawl and means for operating the cord or chain from the vehicle driver's platform substantially as described.

4. In a life-saving device for tram cars and like vehicles, a pivoted gate supported at the forward ends of brackets fixed to the car truck, a shaft mounted in the brackets forming the support for the pivoted gate, a lever fixed on said shaft and rigidly secured to the pivoted gate, a second arm projecting from the lever provided with a projecting snug and a link coupled to a pivoted tray having a cam-shaped slot at its forward end in which is a projection engaging with the snug on the second arm of the lever substantially as described.

5. The combination, with the frame of a vehicle, of brackets secured thereto and arranged in front of its wheels, a rear shaft carried by the said brackets, a lever carried by the rear shaft and projecting upwardly, a cradle or scoop operatively connected with the said lever and carried by the rear shaft, a front shaft supported by the said brackets, a gate carried by the front shaft, an upwardly projecting arm carried by the front shaft and provided with a projection engaging with the gate so that the said arm is moved forwardly when the gate is moved pivotally to the rear, a link pivoted at its rear end to the said lever, and disengageable catch mechanism between the front end of the link and the said arm which permits the gate to return to its normal position after being moved rearwardly without moving the cradle or scoop in the reverse direction.

In testimony whereof I have hereunto set my hand in the presence of two witnesses.

THOMAS ARTHUR BENNETT.

Witnesses:
WILLIAM HENRY TAYLOR,
AMY E. EVINS.

---

Copies of this patent may be obtained for five cents each, by addressing the "Commissioner of Patents, Washington, D. C."